3,068,198
SYNERGISTIC ANTIOXIDANT COMPOSITIONS
Paul G. Haines and Harry E. Albert, Lafayette Hills, Pa., assignors to Pennsalt Chemicals Corporation, Philadelphia, Pa., a corporation of Pennsylvania
No Drawing. Filed Dec. 29, 1960, Ser. No. 79,133
14 Claims. (Cl. 260—45.95)

This invention relates to the stabilization of rubber.

A variety of materials, generally referred to as stabilizers or antioxidants, are known to be active in inhibiting the deterioration of rubber upon aging. The aging of rubber is evidenced in various ways such as stiffening, cracking, loss of tensile strength, embrittlement, discoloration, etc., and is generally considered to result at least in part from atmospheric oxidation. Many rubber stabilizers or antioxidants in common use such as phenyl-beta-naphthylamine have good antioxidant activity but tend to cause staining or discoloration of white or light colored rubber stocks. Those rubber stabilizers which are both relatively nonstaining and have good antioxidant activity are prized materials and there is a demand for materials which combine these properties in the highest possible degree.

Among the relatively nonstaining rubber stabilizers which have been suggested are certain alkylated phenols, such as styrenated phenol, butylated cresols, 2,4-di-tertiary-octylphenol and polynuclear phenols such as bis(3-tert-butyl-5-methyl-2-hydroxyphenyl)methane and bis(5-tert-octyl-2-hydroxyphenyl)methane. In general these materials have somewhat lower antioxidant activity than many of the staining antioxidants, and there is accordingly a need for improving the antioxidant activity of these phenolic type materials.

In accordance with this invention, it has now been found that there is a marked synergistic action with respect to antioxidant activity among certain bisphenols obtained by condensing a $C_2$ or higher aliphatic aldehyde with certain mixtures of mono- and dialkylated phenols as hereafter defined. It has been found that the bisphenol mixtures thus obtained have surprisingly higher antioxidant activity than the individual bisphenols obtained from the individual mono or individual dialkylated phenol. The synergistic bisphenol mixtures of the invention thus provide a much desired increase in antioxidant activity in a stabilizer which at the same time has excellent non-staining properties. Such bisphenol mixtures have the further advantage of decreased cost since it has been found that they may be prepared at a considerably lower cost than the individuals in the mixture.

The synergistic bisphenol mixtures of the invention are prepared by condensing an aliphatic aldehyde of the formula RCHO where R is an alkyl radical having from 1 to 8 and preferably from 1 to 4 carbon atoms with a mixture of mono and dialkylated phenols, the alkyl groups of which have from 4 to 9 carbon atoms, and in which the molar ratio of mono to dialkylated phenols is in the range of from 10:90 to 75:25 and preferably in the range of from 20:80 to 40:50. The resulting bisphenols have the general structure

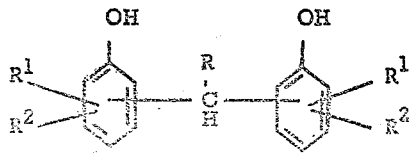

where R is as defined above; where $R^1$ is an alkyl radical having from 4 to 9 carbon atoms; and where $R^2$ may be hydrogen or an alkyl radical having from 4 to 9 carbon atoms. The proportion of mono and dialkylated phenol nuclei in the bisphenol mixture depends of course upon the relative proportions of mono and dialkylated phenol in the starting mixture. The alkyl substituents $R^1$ and $R^2$ will occupy positions ortho and para to the hydroxyl groups. In the mono alkylated nuclei the position occupied will be predominantly para (since mono-alkylation usually occurs first in the para position). In the dialkylated nuclei the positions occupied will be predominantly ortho and para. The alkylidene bridging will usually be predominantly ortho-ortho (since most of the para positions will usually be occupied).

Suitable phenols that may be condensed with the defined aldehydes to form the synergistic mixtures of the invention include, e.g. mixtures of mono- and di-tertiary-butylphenol; mono- and di-tertiary-amylphenol; mono- and di-hexylphenol; mono- and di-heptylphenol; mono- and di-tertiary-octylphenol; mono- and di-sec-octylphenol, etc. Particularly preferred are the tertiary alkylated phenols, i.e. phenols where the alkyl group is attached to the phenol nucleus through a tertiary carbon atom such as in tertiary-butylphenol, tertiary-amylphenol or tertiary-octylphenol. The alkyl group preferably contains from 5 to 8 carbon atoms. Although the alkyl group is preferably an unsubstituted acyclic alkyl group, phenols containing aryl substituted alkyl groups such as mixtures of 4-(1-phenylethyl)phenol and 2,4-bis(1-phenylethyl)phenol or mixtures of 4-(1-phenyl-1-methylethyl)phenol and 2,4-bis(1-phenyl-1-methylethyl)phenol, or phenols containing cycloalkyl groups such as mixtures of 4-cyclohexylphenol and 2,4-dicyclohexylphenol may also be used.

As pointed out above, the molar ratio of mono-alkyl- to the dialkylphenol should be within the range of from 10:90 to 75:25. Preferably this molar ratio is 20:80 to 40:60, i.e. mixtures containing from 20 to 40% of the monoalkylphenol. The maximum degree of synergism will generally be found to occur in these latter ratios.

Preferably, the phenol nucleus should be unsubstituted except for one or two $C_4$ to $C_9$ alkyl groups. However, if desired, in addition these alkyl groups, the phenol nucleus may also contain one methyl group in the meta position. Thus, appropriate mixtures of mono and dialkylated metacresol may also be used.

Suitable aldehydes to be condensed with the above mono and dialkylated phenol mixtures include aliphatic aldehydes from 2 to 9 carbon atoms of the formula RCHO where R is an alkyl group having from 1 to 8 carbon atoms such as acetaldehyde, propionaldehyde, n-butyraldehyde, isobutyraldehyde, n-valeraldehyde, isovaleraldehyde, caproaldehyde and the like. The preferred aldehydes are those containing from 2 to 5 carbon atoms, particularly isobutyraldehyde and $\alpha$-methyl butyraldehyde.

The starting mixture of mono and dialkylated phenols may be prepared, if desired, by mixing the individual components in the proper proportions, thus, for example, mono-tertiary-octyl phenol and di-tertiary-octyl phenol may each be prepared separately and then mixed, for example in the proportions of 40 mole percent mono-tertiary-octyl phenol and 60 mole percent of di-tertiary-octyl phenol to provide a phenol mixture to be condensed with an aldehyde to form a synergistic bisphenol mixture.

On the other hand, the more economical method for preparing the desired mixture of mono and dialkylated phenols is to subject unsubstituted phenol (or metacresol) to alkylation under conditions which will give a mixture of mono and dialkylated phenols in the desired proportions. For example, unsubstituted phenol may be reacted under alkylation conditions with diisobutylene or amylene to produce a mixture of mono and dioctylated, or mono and diamylated phenols respectively. The proportion of mono and dialkylated phenol in the mixture may be readily controlled by the control of the alkylation conditions in a manner well known per se in the art. A further advantage of this later method is that it has been found unnecessary to remove unreacted phenol or side products from the crude alkylate before condensation with the aldehyde to produce the bisphenol mixture. Thus, for example, in the octylation of phenol with diisobutylene, small amounts of unreacted phenol together with small amounts of mono and di-tertiary-butyl phenols may appear in the crude alkylate. It is not necessary to remove these components before condensation with the aldehyde thus obviating the necessity for a tedious and expensive vacuum distillation. The presence of these other components does not affect the antioxidant activity of the final product as will be illustrated in the examples which follow.

The condensation of the mixture of alkylated phenols with the aldehyde should be carried out in such manner that the main products of the condensation are bisphenols with only minor amounts (e.g. 2 to 5%) of higher condensation product such as tris or tetrakis phenols, and such that substantially no resinous material is produced, i.e. molecules containing more than about 4 phenol nuclei. As is well known per se in the art, this may be accomplished readily by controlling the condensation conditions, particularly the molar ratio of aldehyde to phenols. Usually the molar ratio of the aldehyde to phenols should be the order of 0.5 this being the stoichiometric ratio to product bisphenols, although some departure from this ratio, e.g. ratios of from about 0.3 to about 1.5 may be used.

Reaction temperature for the condensation reaction will usually be between about 20° C. and 100° C. preferably in most cases between 40° C. and 80° C. Reaction time is not critical and is generally of the order of 1 to 5 hours. The condensation reaction is preferably carried out in the presence of an acidic catalyst, such as sulfuric or acetic acid. Where the condensation reaction is accomplished by adding an aldehyde to a crude alkylate obtained by alkylating a phenol to produce a mixture of mono- and dialkylphenols in the proper ration, it is preferred to carry out the condensation reaction in the presence of the same catalyst that served as the alkylation catalyst in the previous alkylation reaction. Following this procedure, to effect the condensation, it is merely necessary to add the aldehyde to the crude alkylate and, if required, additional catalyst of the same type employed in the alkylation. It is generally unnecessary prior to the condensation reaction in such cases to remove excess olefin present in the crude alkylate from the alkylation reaction since this can be stripped off, together with other volatiles, following the condensation.

A mole of water is released during the condensation reaction for each mole of aldehyde that reacts, and following the reaction, the water may be mechanically separated from the organic phase or stripped off as distillate. The product is preferably treated to neutralize residual catalyst using, for example, sodium carbonate. The neutralized product is then distilled, desirably at reduced pressure, to strip off volatiles such as water, unreacted olefin and aldehyde and then filtered to remove the insolubles principally inorganic salts.

The following examples illustrate the preparation of synergistic bisphenol mixtures in accordance with the invention:

Example 1

A mixture was prepared containing 25 mole percent 4-tertiary-octylphenol and 75 mole percent 2,4-di-tertiary-octylphenol. The octylated phenols were prepared by alkylation with diisobutylene (a commercial product obtained by the dimerization of isobutylene and consisting approximately of 75% 2,4,4-trimethylpentene-1, 23% 2,4,4-trimethylpentene-2 with about 2% of other octene isomers).

To a 289.5 gram portion of this mixture there is added 4 grams of 96% sulfuric acid and then while stirring, 46.8 grams (0.65 mole) of isobutyraldehyde over a period of 0.5 hours at a reaction temperature of 70° C. Stirring is continued for an additional 2 hours at from 65 to 75° C. Sufficient sodium carbonate was added to neutralize the reaction mixture. It was freed of volatile materials by passing steam through it at about 115–130° C. After drying by application of reduced pressure to the hot mixture, inorganic salts were removed by filtration to give 312 grams of viscous oil consisting of a mixture of mono- and di-tertiary-octylated bisphenols of the general structure

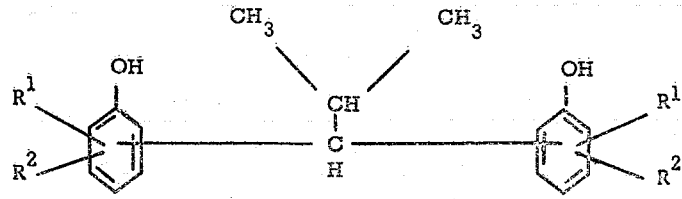

where $R^1$ is tertiary-octyl, and where $R^2$ is hydrogen or tertiary-octyl, the ratio of mono-tertiary-octylated to di-tertiary octylated phenol nuclei being 25:75. The tertiary-octyl substituents are in the ortho and para positions while the alkylidene bridging is predominantly ortho-ortho.

Example 2

Example 1 was repeated using the same procedures except that the starting mixture of alkylated phenols contained 50 mole percent of 4-tertiary-octylphenol and 50 mole percent of 2,4-di-tertiary-octylphenol instead of the 25–75 mixture used in Example 1. The product obtained was a brown viscous oil consisting of a mixture of mono- and di-tertiary octylated bisphenols of the same general structure as in Example 1 except for the ratio of mono- to dioctylated phenol nuclei.

Example 3

Example 1 was repeated using the same procedures except that the starting mixture of octylated phenols contained 75% of 4-tertiary-octylphenol and 25% of 2,4-di-tertiary-octylphenol instead of the 25–75 mixture used in Example 1. A brown viscous oil was obtained consisting of a mixture of mono and ditertiary octylated bisphenols of the same general structure as in Example 1 except for the ratio of the mono- to dioctylated phenol nuclei.

Example 4

This example illustrates the preferred method for preparing the antioxidant compositions of the invention wherein phenol is alkylated under conditions to give a crude alkylate containing mono- and dialkylated phenol in the desired proportions. The crude alkylate is obtained from the alkylation reaction, without any further treatment, is then condensed with an aldehyde to produce a mixture of bisphenols containing mono- and dialkylated nuclei in the desired proportions.

In accordance with this procedure, a mixture of 30.3 grams (0.32 mole) of phenol and 1.4 grams of concentrated (96%) sulfuric acid is placed in a glass reactor fitted with a stirrer and water cooled reflux condenser. While stirring, 71.8 grams (0.64 mole) of diisobutylene (same composition as in Example 1) is added over a period of one-half hour while maintaining the reaction temperature at from 65° to 75° C. Stirring is continued at 65° to 75° C. for an additional one and a half hours.

Fractional distillation of an aliquot of the crude alkylate prepared as above shows it to have the following approximate composition:

52.0 mole percent 2,4-di-tertiary-octylphenol 27.8 mole percent 4-tertiary-octylphenol
7.0 mole percent 2,4-di-tertiary-butylphenol and polyolefins
5.0 mole percent mono-tertiary-butylphenol
4.0 mole percent phenol The molar ratio of 4-tertiary-octylphenol to 2,4-di-tertiary-octylphenol in this mixture is approximately 35:65.

To this crude alkylate 15.2 grams (0.21 mole) of isobutyraldehyde is added over a period of two hours while stirring at a reaction temperature of 65° C. Stirring is continued for an additional 2 hours at a temperature of from 65° to 75° C. The lower aqueous layer is separated from the upper organic layer and the organic layer is charged to a still together with sufficient sodium carbonate to neutralize any acidity. The mixture is distilled to strip off low boiling material until a still pot temperature of 150° C. at 20 mm. Hg is reached. The still-pot residue is filtered through a heated filter to remove inorganic salts. The filtrate, 100 grams of a brown viscous oil, is the product. This product has a Gardner color of 11–12, a Brookfield viscosity of 403 at 27° C., a specific gravity of 0.926 at 25° C. and a refractive index at 1.4950 at 29° C.

This product consists essentially of a mixture of bisphenols containing mono- and dialkylated nuclei with minor amounts of unsubstituted bisphenols (from the small amount of phenol in the crude alkylate) and minor amounts of bisphenols containing mono- and dibutylated nuclei (resulting from the presence of the minor amounts of mono- and di-tertiary-butylphenol in the crude alkylate).

*Example 5*

A commercial 4-tertiary-amylphenol and a commercial 2,4-di-tertiary-amylphenol were combined in the proper proportions to provide a mixture containing 25 mole percent of 4-tertiary-amylphenol and 75 mole percent 2,4-di-tertiary-amylphenol.

To 217 grams of this mixture (0.25 mole 4-tertiary-amyl- and 0.75 mole 2,4-di-tertiary-amylphenol) there is added 4 grams of 96% sulfuric acid and then while stirring 46.8 grams (0.65 mole) of isobutyraldehyde over a period of 0.3 hours and then reacted for 2 hours at 70° C. Anhydrous sodium carbonate is added to neutralize the mixture which is then freed of volatile materials by passing steam through it at about 115–130° C. Reduced pressure is applied to dry the product and inorganic salts are removed by filtration. The product (236 grams) is a brown viscous liquid consisting of a mixture of bisphenols having mono- and di-tertiary amylated nuclei of the general structure

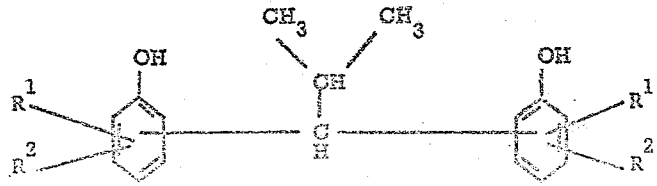

where $R^1$ is a tertiary-amyl radical and where $R^2$ may be hydrogen or a tertiary-amyl radical, the ratio of mono-amylated to diamylated phenol nuclei being 25:75. Amyl substitution is ortho and para while the alkylidene bridging is mainly ortho-ortho.

The bisphenol mixtures of the invention are useful as stabilizers for both natural and synthetic rubber, both in the vulcanized and unvulcanized state. Thus, they may be used for the stabilization of sulfur vulcanized natural and synthetic rubber stock. The stabilizer may be incorporated in the rubber before or after vulcanization, although normally it is added to the rubber batch during compounding prior to vulcanization. In some cases, however, the stabilizer may be applied from a solution in an organic solvent by dipping the vulcanized article in the solution. The stabilizers of the invention being soluble in rubber will penetrate the surface and dissolve in the rubber.

Typical synthetic rubbers that may be stabilized by the bisphenol mixtures of the invention include the rubbery polymers of the 1,3-butadienes and copolymers with other polymerizable compounds such as styrene, vinylnaphthalene, acrylic acid, methyl acrylate, acrylonitrile, isobutylene, methylvinyl ether, methylvinyl ketone, and the like. Specific commercial synthetic rubbers include, e.g. copolymers of butadiene-1,3 and styrene (Buna-S or SBR rubber); copolymers of butadiene-1,3 and acrylonitrile (Buna-N or NBR rubber); polymerized chloro-2-butadiene-1,3 (neoprene).

The stabilizers of the invention are also useful for the stabilization of natural and synthetic rubber latices before or after coagulation and are particularly suitable for the stabilization of coagulated unvulcanized synthetic rubber polymer, such as a polymer crumb coagulated from a butadiene-1,3-styrene copolymer latex.

The amount of the bisphenol mixtures of the invention incorporated in the rubber is not critical. Ordinarily, small amounts of the order of 0.1 to 5% by weight based on the hydrocarbon content of the rubber compound are satisfactory although amounts outside this range may be employed if desired.

The following evaluation tests of the bisphenol mixtures of the invention show the synergistic behavior of the mixtures as compared to the individual components thereof when used as stabilizers for vulcanized rubber stocks or as stabilizers for an unvulcanized synthetic rubber polymer.

Evaluation tests of the bisphenol stabilizers in vulcanized rubber were conducted as follows: Test samples were prepared according to the following receipe:

| Ingredients: | Parts by weight |
|---|---|
| Pale crepe | 100 |
| Atomite whiting | 50 |
| Titanium dioxide | 20 |
| Zinc oxide | 10 |
| Stearic acid | 2 |
| Spider sulfur | 3 |
| Benzothiazyl disulfide | 1 |
| Stabilizer to be evaluated | 1 |

Using the above recipe, a series of tests were run wherein samples containing the various stabilizers to be tested were cured at 198° F. for 15, 30 and 60 minutes. Test strips were aged at 70° C. for 7 days in a bomb containing oxygen at 300 p.s.i. Tensile strength was determined before and after bomb aging. The antioxidant index was obtained by adding together the values for the percent of tensile strength retained for the three cures. This index is an indication of the antioxidant activity with the better products having higher index values.

In a first series of tests, the bisphenol mixtures of Example 1, and 4 (Samples A, B respectively) containing bisphenols prepared from mixtures of mono- and di-tertiary-octylated phenols were compared in antioxidant activity with bisphenols containing in the one case only mono-tert-octylated phenol nuclei (Sample C) and in the second case with bisphenols containing only di-tert-octylated phenol nuclei (Sample D). The bisphenols of Sample C were prepared by condensing isobutyraldehyde with para-tertiary-octyl phenol while the bisphenols of Example D where prepared by condensing isobutyraldehyde with ortho, para-di-tertiary-octyl phenol. The results of these evaluations are shown in Table 1.

TABLE I

| Sample | Stabilizer composition | Antioxidant index |
|---|---|---|
| A | Bisphenol mixture of Ex. 1—Condensation of isobutyraldehyde with 25% 4-tertiary-octylphenol plus 75% 2,4-di-tertiary-octylphenol. | 213 |
| B | Bisphenol mixture of Ex. 4—Condensation of isobutyraldehyde with 35% 4-tertiary-octylphenol plus 65% 2,4-tertiary-octylphenol. | 227 |
| C | Bisphenol of isobutyraldehyde with 100% 4-tertiary-octylphenol. | 198 |
| D | Bisphenol of isobutyraldehyde with 100% 2,4-di-tertiary-octylphenol. | 191 |

As is apparent from the above table, the bisphenol mixtures in which the phenol nuclei were both mono- and dialkylated displayed a higher antioxidant index than either of the individual components when used alone, demonstrating the synergism between the bisphenol mixtures.

A second series of tests was run in which the antioxidant activity of the product of Example 5 (Sample E) (this being a mixture of bisphenols prepared from isobutyraldehyde and a mixture of 4-tertiary-amyl- and 2,4-di-tertiary-amylphenol), was compared to that of a bisphenol prepared by the condensation of isobutyraldehyde with 4-tertiary-amylphenol (Sample F) and with the bisphenol prepared by the condensation of isobutyraldehyde with 2,4-di-tertiary-amyl phenol (Sample G). The results of these tests are shown in Table II.

TABLE II

| Sample | Stabilizer composition | Antioxidant index |
|---|---|---|
| E | Bisphenol mixture of Ex. 5—Condensation of isobutyraldehyde with 25% p-tertamyl phenol plus 75% di-tert-amyl phenol. | 180 |
| F | Bisphenol of isobutyraldehyde with 100% mono-p-tert-amyl phenol. | 161 |
| G | Bisphenol of isobutyraldehyde with 100% di-tert-amyl phenol. | 178 |

To demonstrate the synergism of the bisphenol mixtures of the invention when used as stabilizers for unvulcanized synthetic rubber polymer, tests were carried out in the following manner. A soap emulsion of the stabilizers to be tested was added in an amount equal to 1.25 parts of stabilizer per one-hundred parts of rubber to unstabilized SBR 1502 latex containing 16.7% rubber hydrocarbon solids. The SBR 1502 latex is a commercial product produced by the emulsion polymerization of a mixture of 72 parts by weight of butadiene and 28 parts of styrene. The latex was coagulated to a crumb by adding it dropwise to a rapidly stirred aqueous solution of sodium chloride and sulfuric acid. The resulting polymer crumb was water washed and then dried at 50° C. for 6 hours. The dry polymer crumb, in small aluminum foil dishes, was aged at 100° C. for 96 hours. During aging it was observed each 24 hours for (a) whether fused or not, (b) surface softness, (c) color and (d) approximate state of cure. Under these conditions a sample of unstabilized polymer, in twenty-four hours, will become fused, develop surface hardness and a fair state of cure. In order to provide a basis for comparison, the various samples in each series of tests was rated as first, second or third etc. and assigned the corresponding numbers 1, 2, 3 etc., the lower number being assigned to the sample showing the least deterioration. Two or more samples showing equal deterioration were assigned the same number. The "stabilization index" was determined by adding the values for observations of the sample. The lowest stabilization index values therefore represent the best stabilized polymer over the period of the accelerating aging.

In the first series of tests the stabilization activity of the bisphenol mixtures of Example I (Sample H), Example 2 (Sample I) and Example 3 (Sample J) were compared with a bisphenol prepared by the condensation of isobutyraldehyde with mono-para-tertiary-octyl phenol (Example K) and with a bisphenol prepared by the condensation of isobutyraldehyde with o,p,-di-tertiary-octyl phenol (Sample L). The results are listed in Table III.

TABLE III

| Sample | Stabilizer composition | 24 hours Appearance | Rating | 48 hours Appearance | Rating | 72 hours Appearance | Rating | 96 hours Appearance | Rating | Stabilization index |
|---|---|---|---|---|---|---|---|---|---|---|
| H | Bisphenol mixture of Ex. 1—Condensation of isobutyraldehyde with 25% p-tert-octyl phenol plus 75% di-tert-octyl phenol. | Not fused, white, soft, no cure. | 1 | Very slightly fused, white and yellow, soft, no cure. | 1 | Fused, yellow, soft, very slight cure. | 1 | Fused, yellow, soft, very slight cure. | 1 | 4 |
| I | Bisphenol mixture of Ex. 2—Condensation of isobutyraldehyde with 50% p-tert-octyl phenol plus 50% di-tert-octyl phenol. | Slightly fused, yellow and white, soft, no cure. | 2 | Fused, yellow, soft, no cure. | 2 | do | 2 | Fused, yellow, soft, slight cure. | 2 | 8 |
| J | Bisphenol mixture of Ex. 3—Condensation of isobutyraldehyde with 75% p-tert-octyl phenol plus 25% di-tert-octyl phenol. | Partly fused, yellow and white, soft, no cure. | 3 | Fused, yellow, soft, very slight cure. | 3 | do | 2 | Fused, yellow, soft, some cure. | 3 | 11 |
| K | Bisphenol of isobutyraldehyde with 100% di-tert-octyl phenol. | Fused, yellow, soft, no cure. | 4 | Fused, yellow, soft, slight cure. | 4 | Fused, yellow, soft, slight cure. | 3 | do | 3 | 14 |
| L | do | do | 4 | Fused, yellow, soft, no cure. | 2 | Fused, yellow, soft, some cure. | 4 | do | 3 | 13 |

As may be seen from the above table the mixture of bisphenois of Example 5 containing both mono and diamylated nuclei are superior to the bisphenols prepared from the individual mono and diamylated phenols.

As is apparent from Table III, the bisphenol mixtures containing a mixture of mono and dialkylated phenol nuclei were in every case more active stabilizers than the bisphenols prepared from individual mono and individual di-tertiary-octyl phenol respectively.

In a second series of tests, the stabilization activity of the bisphenol mixture of Example 5 (Sample M) was compared with the stabilization activity of a bisphenol prepared by the condensation of isobutyraldehyde with mono-para-tertiary-amyl phenol (Sample N) and with a bisphenol prepared by the condensation of isobutyraldehyde with o,p-di-tertiary-amyl phenol (Sample O). The results are set forth in Table IV below:

TABLE IV

| Sample | Stablizer composition | 24 hours | | 48 hours | | 72 hours | | 96 hours | | Stabilization index |
|---|---|---|---|---|---|---|---|---|---|---|
| | | Appearance | Rating | Appearance | Rating | Appearance | Rating | Appearance | Rating | |
| M | Bisphenol mixture of Ex. 5—Condensation of isobutyraldehyde with 25% p-tert-amyl phenol plus 75% di-tert-amyl-phenol. | Not fused, soft, white, no cure. | 1 | Very slightly fused, soft, white, no cure. | 1 | Slightly fused, soft, pale yellow, no cure. | 1 | Slightly fused, soft, pale yellow, very slight cure. | 1 | 4 |
| N | Bisphenol of isobutyraldehyde with 100% p-tert-amyl phenol. | Partly fused, soft, yellow, slight cure. | 2 | Partly fused, soft, yellow, slight cure. | 3 | Partly fused, soft, yellow, slight cure. | 2 | Fused, soft, yellow, slight cure. | 3 | 10 |
| O | Bisphenol of isobutyraldehyde with 100% di-tert-amyl phenol. | Not fused, soft, white, no cure. | 1 | Slightly fused, soft, off white, no cure. | 2 | Slightly fused, soft, pale yellow, no cure. | 1 | Partly fused, soft, pale yellow, very slight cure. | 2 | 6 |

The synergism between the bisphenols having both mono and dialkylated nuclei as compared to the individual components is again apparent from Table IV.

This application is a continuation-in-part of copending application Serial No. 789,498, filed January 28, 1959 by Paul G. Haines and Harry E. Albert for Antioxidant Compositions, and now abandoned.

We claim:

1. A rubber composition having incorporated therein a mixture of bisphenols having the general formula:

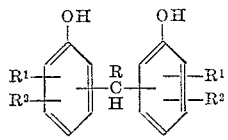

where R is an alkyl group having from 1 to 8 carbon atoms; where $R^1$ is an alkyl group having from 4 to 9 carbon atoms; where $R^2$ is selected from the class consisting of hydrogen and alkyl groups having from 4 to 9 carbon atoms; where said alkyl substituents occupy positions ortho and para to the hydroxy groups; and where the alkylidene bridging occurs predominately ortho-ortho to the hydroxy group; said bisphenols being obtained by condensing an aliphatic aldehyde of the formula RCHO where R is as defined above with a mixture of mono and dialkylated phenols, the alkyl groups of which have from 4 to 9 carbon atoms, and in which the molar ratio of mono to dialkylated phenol is in the range from 10:90 to 75:25.

2. A rubber composition in accordance with claim 1 in which the molar ratio of mono alkylated to dialkylated phenol is in the range of from 20:80 to 40:60.

3. A rubber composition having incorporated therein a mixture of bisphenols having the general formula:

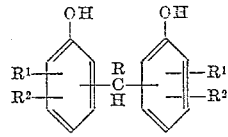

where R is an alkyl group having from 1 to 4 carbon atoms; where $R^1$ is an alkyl group having from 5 to 8 carbon atoms; where $R^2$ is selected from the class consisting of hydrogen and alkyl groups having from 5 to 8 carbon atoms; where said alkyl substituents occupy positions ortho and para to the hydroxy groups; and where the alkylidene bridging is predominately ortho-ortho to the hydroxy groups; said bisphenols being obtained by condensing an aliphatic aldehyde of the formula RCHO where R is an alkyl group having from 1 to 4 carbon atoms with a mixture of mono and dialkylated phenols, the alkyl groups of which have from 5 to 8 carbon atoms and in which the molar ratio of mono to dialkylated phenol is in the range of from 10:90 to 75:25.

4. A rubber composition in accordance with claim 3 in which the ratio of mono to dialkylated phenol is in the range of from 20:80 to 40:60.

5. An unvulcanized synthetic rubber having incorporated therein a mixture of bisphenols having the general formula:

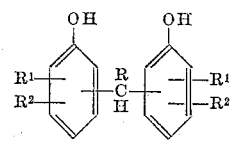

where R is an alkyl group having from 1 to 8 carbon atoms; where $R^1$ is an alkyl group having from 4 to 9 carbon atoms; where $R^2$ is selected from the class consisting of hydrogen and alkyl groups having from 4 to 9 carbon atoms; where said alkyl substituents occupy positions ortho and para to the hydroxy groups; and where the alkylidene bridging occurs predominately ortho-ortho to the hydroxy group; said bisphenols being obtained by condensing an aliphatic aldehyde of the formula RCHO where R is as defined above with a mixture of mono and dialkylated phenols the alkyl groups of which have from 4 to 9 carbon atoms and in which the molar ratio of mono to dialkylated phenol is in the range of from 10:90 to 75:25.

6. An unvulcanized synthetic rubber having incorporated therein a mixture of bisphenols having the general formula:

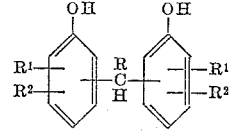

where R is an alkyl group having from 1 to 4 carbon atoms; where $R^1$ is an alkyl group having from 5 to 8 carbon atoms; where $R^2$ is selected from the class consisting of hydrogen and alkyl groups having from 5 to 8 carbon atoms; where said alkyl substituents occupy positions ortho and para to the hydroxy groups; and where the alkylidene bridging is predominately ortho-ortho to the hydroxy groups; said bisphenols being obtained by condensing an aliphatic aldehyde of the formula RCHO where R is an alkyl group having from 1 to 4 carbon atoms with a mixture of mono and dialkylated phenols, the alkyl groups of which have from 5 to 8 carbon atoms and in which the molar ratio of mono to dialkylated phenol is in the range of from 10:90 to 75:25.

7. An unvulcanied synthetic rubber composition in accordance with claim 6 in which the molar ratio of monoalkylated to dialkylated phenol is in the range of from 20:80 to 40:60.

8. An unvulcanized synthetic rubber comprising a copolymer of styrene and butadiene having incorporated therein a mixture of bisphenols having the general formula:

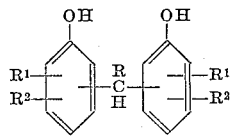

where R is an alkyl group having from 1 to 8 carbon atoms; where $R^1$ is an alkyl group having from 4 to 9 carbon atoms; where $R^2$ is selected from the class consisting of hydrogen and alkyl groups having from 4 to 9 carbon atoms; where said alkyl substituents occupy positions ortho and para to the hydroxy groups; and where the alkylidene bridging occurs predominately ortho-ortho to the hydroxy group; said bisphenols being obtained by condensing an aliphatic aldehyde of the formula RCHO where R is as defined above with a mixture of mono and dialkylated phenols, the alkyl groups of which have from 4 to 9 carbon atoms, and in which the molar ratio of mono to dialkylated phenol is in the range of from 10:90 to 75:25.

9. An unvulcanized synthetic rubber comprising a copolymer of styrene and butadiene having incorporated therein a mixture of bisphenols having the general formula:

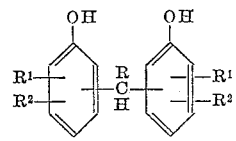

where R is an alkyl group having from 1 to 4 carbon atoms; where $R^1$ is an alkyl group having from 5 to 8 carbon atoms; where $R^2$ is selected from the class consisting of hydrogen and alkyl groups having from 5 to 8 carbon atoms; where said alkyl substituents occupy position ortho and para to the hydroxy groups; and where the alkylidene bridging is predominately ortho-ortho to the hydroxy groups; said bisphenols being obtained by condensing an aliphatic aldehyde of the formula RCHO where R is an alkyl group having from 1 to 4 carbon atoms with a mixture of mono and dialkylated phenols, the alkyl groups of which have from 5 to 8 carbon atoms, and in which the molar ratio of mono to dialkylated phenol is in the range of from 10:90 to 75:25.

10. An unvulcanized synthetic rubber composition in accordance with claim 9 in which the molar ratio of mono to dialkylated phenol is in the range of 20:80 to 40:60.

11. As a relatively non-staining rubber antioxidant, a mixture of bisphenols having the general formula:

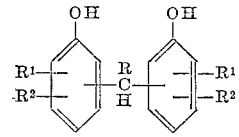

where R is an alkyl group having from 1 to 8 carbon atoms; where $R^1$ is an alkyl group having from 4 to 9 carbon atoms; where $R^2$ is selected from the class consisting of hydrogen and alkyl groups having from 4 to 9 carbon atoms; where said alkyl substituents occupy positions ortho and para to the hydroxy groups; and where the alkylidene bridging occurs predominately ortho-ortho to the hydroxy group; said bisphenols being obtained by condensing an aliphatic aldehyde of the formula RCHO where R is as defined above with a mixture of mono and dialkylated phenols, the alkyl groups of which have from 4 to 9 carbon atoms, and in which the molar ratio of mono to dialkylated phenol is in the range of from 10:90 to 75:25.

12. A mixture of bisphenols in accordance with claim 11 in which the molar ratio of mono to dialkylated phenol is in the range of from 20:80 to 40:60.

13. As a relatively non-staining rubber antioxidant, a mixture of bisphenols having the general formula:

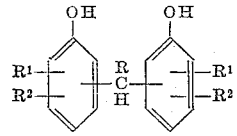

where R is an alkyl group having from 1 to 4 carbon atoms; where $R^1$ is an alkyl group having from 5 to 8 carbon atoms; where $R^2$ is selected from the class consisting of hydrogen and alkyl groups having from 5 to 8 carbon atoms; where said alkyl substituents occupy positions ortho and para to the hydroxy groups; and where the alkylidene bridging is predominately ortho-ortho to the hydroxy groups; said bisphenols being obtained by condensing an aliphatic aldehyde of the formula RCHO where R is an alkyl group having from 1 to 4 carbon atoms with a mixture of mono and dialkylated phenols, the alkyl groups of which have from 5 to 8 carbon atoms and in which the molar ratio of mono to dialkylated phenol is in the range of 10:90 to 75:25.

14. A mixture of bisphenols in accordance with claim 13 in which the molar ratio of mono to dialkylated phenol is in the range of from 20:80 to 40:60.

References Cited in the file of this patent

UNITED STATES PATENTS

| | | |
|---|---|---|
| 2,628,953 | Newby | Feb. 17, 1953 |
| 2,877,209 | Jansen et al. | Mar. 10, 1959 |

FOREIGN PATENTS

| | | |
|---|---|---|
| 1,196,525 | France | May 25, 1959 |

UNITED STATES PATENT OFFICE
CERTIFICATE OF CORRECTION

Patent No. 3,068,198                        December 11, 1962

Paul G. Haines et al.

It is hereby certified that error appears in the above numbered patent requiring correction and that the said Letters Patent should read as corrected below.

Column 1, line 58, for "from 20:80 to 40:50" read -- from 20:80 to 40:60 --; column 10, line 72, for "unvulcanied" read -- unvulcanized --.

Signed and sealed this 11th day of June 1963.

(SEAL)
Attest:

ERNEST W. SWIDER                            DAVID L. LADD
Attesting Officer                               Commissioner of Patents